Patented Jan. 9, 1951

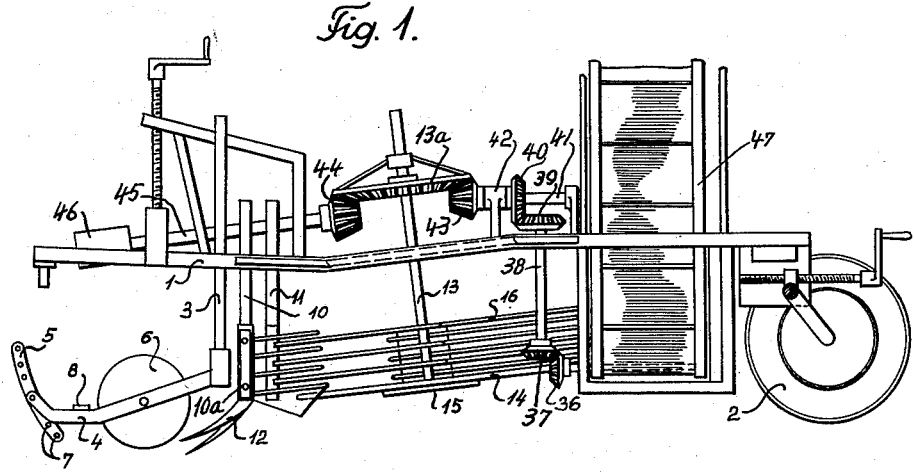
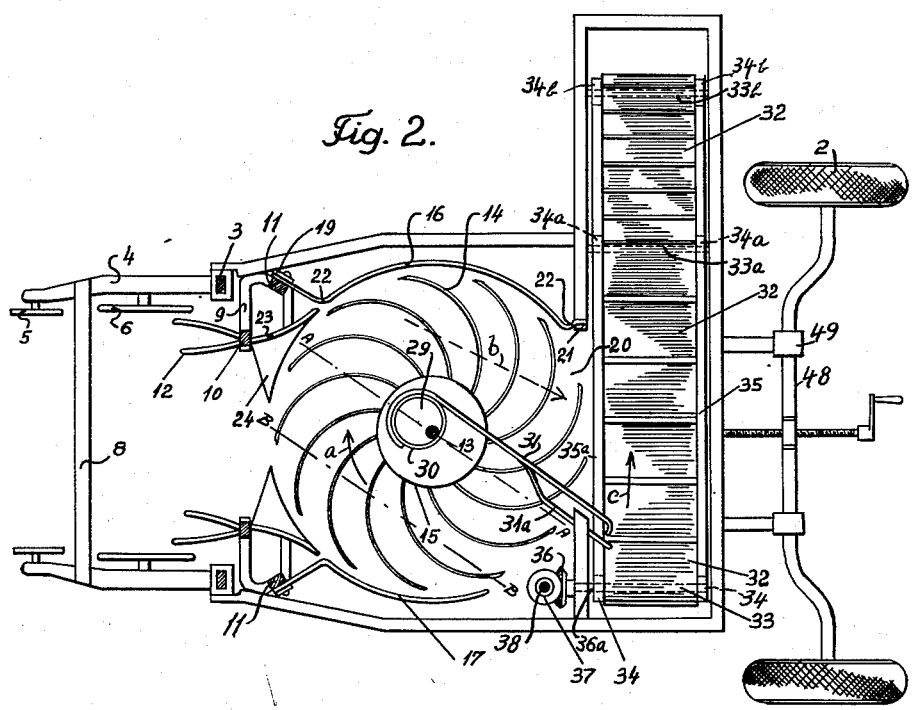

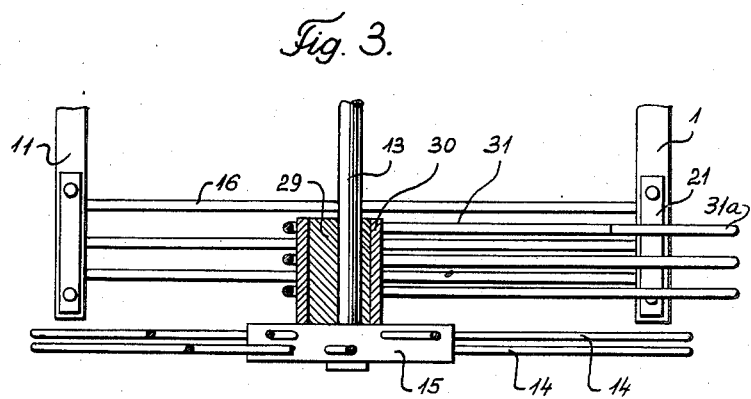
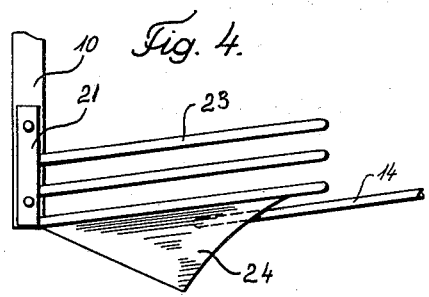
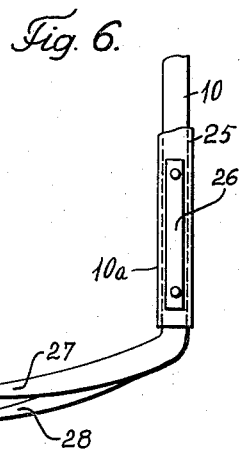
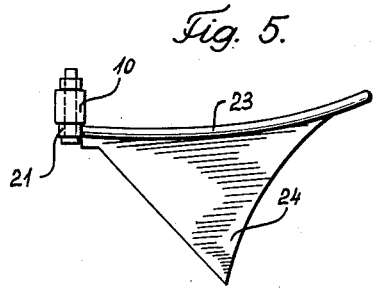

2,537,118

UNITED STATES PATENT OFFICE 2,537,118

BEET HARVESTING MACHINE

Anders Karl Kristian Andersen, Stenstrup, and Thomas Rosenstand, Korinth, Denmark Application April 27, 1948, Serial No. 23,424
In Denmark December 13, 1946

9 Claims. (Cl. 55—106)

The present invention relates to an improved beet lifting and harvesting machine, preferably for lifting sugar beets.

It is already known to construct a beet lifting machine in which two rows of previously topped beet are lifted simultaneously and cleaned on a rotating spinner, from which they are discharged rearwardly or laterally. It is likewise known to arrange the spinner somewhat inclined forwardly to allow an easy access of the lifted beet to the spinner, as likewise it is known to provide the spinner with a fence to guide the beet rearwardly.

The hitherto known machines suffer, however, from various drawbacks which result in a disproportionally great number of the beets being damaged and accordingly rendered unfit for storage, and a considerable quantity of the valuable juices of sugar beet being lost. These and other disadvantages are due first of all to the fact that the spinner, in order to ensure the feeding of the lifted beet to the spinner, had been adjusted so that its foremost edge runs close to the earth. As the spinner rotates the ends of the spinner rods will strike the beet just lifted and in many instances will injure them more or less. Another reason for the said disadvantages is that the fence rods are attached to a number of spaced vertical supports. As it is not possible to avoid some foreign matter such as leaves, stones and the like entering the spinner, such foreign matter is liable to be held by the said vertical supports, thus blocking the free travel of the beet along the spinner, and consequently a congestion of beet will occur in the spinner and considerable damage to the beet as well as the machine may result. Such congestion delays the work, as it is necessary to stop the machine to remove the obstructions therein.

The main object of the present invention is to provide means for constructing a beet lifting machine in which the drawbacks mentioned are eliminated, said means consisting mainly in members that allow the lifted beet to enter the spinner without being subjected to blows from the ends of the spinner rods, and in members so constructed that a congestion of beets in the spinner is avoided.

The first mentioned means comprise slide plates so positioned in relation to the lifting members and the spinner that the lifted beets are carried over the spinner edge. These slide plates provide the advantage, that the spinner need not be adjusted so close to the earth as hitherto has been found necessary, and accordingly the rods are not subjected to the wear caused by friction with the earth during rotation. The prevention of congestion is obtained by the ends of the fence rods, that are curved to conform to the periphery of the spinner, being curved back from the spinner outside the general vertical plane of the fence and attached to parts of the frame, and short auxiliary fence rods interposed between the foremost backwardly curved portion of the fence rods and the lifting member at the same side of the machine. Thus all vertical supporting members along the path of the beet through the spinner are dispensed with, and all foreign matter such as leaves and stones or the like will pass out through the spaces between the rods.

A further object of the invention is to provide auxiliary feeding means in the spinner for speeding up the discharge and for ensuring a smooth passage of the beet through the spinner.

Finally the machine is constructed for cooperation with a conveyor arranged transversely to the machine and combined with an elevator for raising the beets to a suitable height for their discharge into a vehicle driving alongside the machine, thus ensuring that the cleaned beets do not again contact the earth but can be carted directly to the place of storage.

Various further advantages offered by the sugar beet lifting machine according to the invention will be apparent from the following description with reference to the accompanying drawing, in which Fig. 1 is a side elevation of the machine with the upper end of the elevator broken off, Fig. 2 a top elevation of the machine with the upper part of the machine frame removed, Fig. 3 is a cross section on an enlarged side taken through the machine on line A—A in Fig. 2, and through the spinner on line B—B, Fig. 4 a side elevation of a slide plate and auxiliary fence, Fig. 5 a top elevation of same, and Fig. 6 the lifting member in side elevation.

Referring to Figs. 1 and 2, the machine comprises a substantially rectangular frame 1 which at its rear end carries two wheels 2. To the front end of the frame is attached on either side thereof a vertical post 3 carrying on its lower end a forwardly extending runner 4 to the foremost end of which is attached a colter 5. Behind this colter the runner 4 carries a disc cutter 6. The post 3 with colter 5 and the disc cutter 6 is adjustable vertically in the frame, and colter 5 is provided with a number of holes 7 to allow its adjustment to various depths into the earth. The two runners 4 are relatively braced by means of a transverse rod 8. A short distance behind each post 3 a strap member 9 is attached to the frame, which strap member carries two vertical posts 10 and 11, of which post 10 is somewhat displaced inwardly from the frame and carries on its lower end a beet lifting member 12.

Centrally within the frame 1 and behind the beet lifters is arranged a beet cleaning device described below, and behind this cleaning device is attached a beet conveyor in connection with an elevator.

The beet cleaning device consists of a centrally disposed mainly vertical shaft 13, the upper end of which is connected to a gearing mechanism comprising a bevel gear wheel 13a attached to the upper end of shaft 13 and meshing with a smaller bevel gear 44 attached to the rear end of a shaft 45 rotatably journaled in a bearing 46 on the machine frame. The foremost end of shaft 45 is provided with conventional means (not shown) for coupling it to a transmission shaft of a tractor. The lower end of the shaft 13 carries a spinner wheel 14 consisting of a number of curved rods radially extending at a right angle from a central hub 15. The upwardly extending shaft is somewhat forwardly inclined to the effect that the spinner is upwardly inclined from front to rear of the machine. This spinner is partially surrounded by a fence comprising a number of relatively parallel rods 16 surrounding the one side of the spinner 14, and a number of relatively parallel rods 17 extending along a part of the spinner at the other side thereof. The front ends of rods 16 are attached to the vertical post 11 supported by strap 9 by means of clamp 19, and the rear ends are attached to frame 1 by means of clamp 21 at the one end of an opening 20 between the cleaning device and the conveyor. As shown in Fig. 2 the ends of the rods 16 are curved back and attached at points positioned rearwardly in relation to the general curvature of the bars corresponding to the periphery of the spinner, thus providing smooth rounded surfaces 22 at each end facing the spinner. The fence rods 17 at the other side of the spinner extend forwardly and are attached to the post 11 at that side of the frame. To the post 10 on the other side of the frame a number of short fence rods 23 are clamped by means of a clamp 21, see Fig. 4. These fence rods 23 extend almost to the foremost curved ends 22 of the fence rods 16 and are curved in such a manner as to produce a smooth rounded extension forwardly of the rods 16, see Fig. 2. The lowermost of the short fence rods 23 and the foremost part of the lower fence rod 17 which may be constructed similarly to fence rods 23 have each attached thereto a slide plate 24 of substantially triangular shape. The rear edge of these plates extends along the periphery of the spinner to a short distance from the axis of the machine, and the edge is raised slightly higher than the spinner edge.

The beet lifting member is shown on an enlarged scale in Fig. 6 and consists of a bar 25 that is clamped to the lower end of post 10 by means of a clamp 26. At its lower end the bar 25 has a forwardly extending fork comprising two prongs 27 and 28, the outer prong 27 being slightly longer than the inner prong 28 and its end is somewhat elevated in relation to prong 28. The foremost side of the rod 10 carries a cutter edge 10a for severing any leaves or the like lifted by the beet lifters, to prevent such leaves entangling members of the machine.

The spinner shaft 13 is centrally attached to the hub 15 and has rigidly attached to it above the said hub an eccentrically arranged cylindrical hub extension 29. This hub extension is surrounded by a bushing 30 that is freely rotatable thereon. To this bushing a number of vertically spaced feeding rods 31 are attached, said rods extending somewhat beyond the rear end of the spinner 14 and through the opening 20 in the frame to the conveyor. One or several of the rods 31 are provided with a lateral guide rod 31a which is angularly bent and whose rear end is slidable in a hole in the frame 1 as indicated in Fig. 2. During rotation of the spinner 14 in the direction of arrow a, the hub extension 29 will rotate eccentrically, transmitting an oscillating movement to bushing 30 and thereby pushing rods 31 and 31a, attached to said bushing, back and forth. The movement of the rods 31 and 31a in the direction of arrow b will move the beets off the spinner and toward the conveyor and thus serve to prevent congestion of beets in the spinner.

The conveyor at the rear end of the machine is of conventional type comprising an endless belt 32 running over rollers 33, 33a and 33b, which by means of sprockets 34, 34a and 34b, respectively, and chains 35, 35a is operated through bevel gearing 36 connected to extension shaft 36a of roller 33. Gear 36 meshes with another bevel gear 37 attached to the lower end of a vertical shaft 38, the upper end of which has attached thereto a bevel gear 39 meshing with a bevel gear 40 attached to the one end of a shaft 41 journaled in a bearing 42 attached to the machine frame 1. The shaft 41 has attached to its other end a bevel gear 43 meshing with the bevel gear 13a on the upper end of shaft 13. By means of this gearing the conveyor belt 32 is moved in the direction indicated by arrow c in Fig. 2. At the one side of the machine the conveyor is connected to an elevator 47 likewise of conventional type, and by means of which the beets are raised to a suitable height subsequently to be deposited into a vehicle driving alongside the machine. As such conveyors and elevators are commonly known, and as the machine is not limited to any particular construction of conveyor and elevator, it is not deemed necessary to describe them in detail. It is only to be remarked that the conveyor belt that runs transversely to the machine is situated slightly lower than the rear edge of the spinner 14. The wheels 2 are mounted on each offset end of a shaft 48 journaled in bearing 49 attached to the rear end of the machine frame 1.

Having described the general construction of the machine, a brief description of its operation will now be given.

Any tractive power may be used, but the machine described is intended preferably for operation by means of a tractor that is attached to its foremost end. The shaft 45 of the transmission 44, 13a is connected to operational members of the tractor, and the various members are adjusted to their proper height. Upon driving the machine through the beet field, the beets in two rows of previously topped beet are lifted simultaneously by members 12. The colters 5 and discs 6 cut any loose leaves left over after the topping operation, in order to prevent entanglement of such leaves in the lifting members. When the lifting members 12 reach a beet, the beet lifter lifts the beet out of the earth, and on account of the peculiar form of the lifter prongs the beet is thrown inwardly and caught by the triangular slide plates 24, along which they are raised over the edge of the spinner 14. The beet is carried by the rotating spinner 14 towards the outlet 20, being moved along the fence rods 16. In order to prevent congestion of the beet during their passage along the spinner, the eccentrically moving feeding rods 31 will continuously be subjecting the beet to movement rearwardly through the exit opening 20. The thus ejected beets are thrown into the conveyor along which they are transported to the elevator and raised for discharge into a vehicle driving alongside the machine.

To meet varying conditions the fence rods 16 may be adjusted vertically in relation to each other and the spinner by loosening the bolts holding the clamps 19 and 21, moving the rods to a desired relating spacing and again tightening the clamp bolts. In a corresponding manner the short fence rods 23 and the lifting members 12 may be adjusted vertically by loosening and after readjustment again tightening their clamp members 21 and 26 respectively.

The invention is not limited to the construction of the beet lifting machine illustrated, as it is obvious that the machine may be altered in details within the scope of the invention. Thus for instance the various bevelled gear transmission devices may be of any other construction adaptable to the purpose.

We claim:

1. A beet lifting machine, comprising in combination a machine frame, two runners attached to the foremost end of the frame, two beet lifting members relatively spaced between the runners, bar members connecting the beet lifters to the said frame, a substantially vertical shaft journaled in the machine frame, a beet cleaning spinner rotatably attached to the lower end of the said vertical shaft behind the lifting members, means for operating the vertical shaft for rotation in one direction, slide plates disposed at the foremost edge of the spinner for raising lifted beet over the spinner edge, vertically interspaced horizontal fence rods curved about the edge of the spinner and arranged along the one side of the spinner, outwardly curved ends formed on each fence rod, means for attaching the fence rod ends adjustably to the machine frame outside the general vertical plane of the fence, a feed member traversing the spinner rearwardly from the centre thereof, means attached to the spinner for imparting eccentric motion to the foremost end of the feed rod between the center of the spinner and the fence, guide members attached to the rear end of the feed member and slidable longitudinally in the machine frame, a horizontal belt conveyor of conventional type attached transversely to the rear end of the machine frame behind and lower than the spinner, a belt elevator of conventional type connected to the one end of the said conveyor, means for operating the conveyor and elevator belt, and wheels journaled in the rearmost end of the machine frame.

2. A beet lifting machine as claimed in claim 1, the combination in connection with the feed member of a vertical cylinder eccentrically attached to the lower end of the vertical shaft adjacent the upper side of the spinner, a bushing coaxially and rotatably mounted on the said cylinder, a plurality of rods attached by their one end in a vertical row to the said bushing and extending from the side thereof facing the spinner fence, their opposite ends extending obliquely across the spinner to the rear end thereof, and a guide rod attached to and extending rearwardly parallel to the rear end of each feed rod and carried slidably through a hole in the machine frame.

3. A beet lifting machine, comprising in combination, a substantially rectangular frame, a vertical post mounted for vertical adjustment in each side of the frame, a runner attached to the lower end of each post, cutter members attached to each runner, two other vertical posts, means for attaching these other posts vertically adjustable in the frame at a predetermined distance apart, a beet lifting member attached to the lower end of each of the said other posts, a substantially vertical shaft, journaled in the frame behind the beet lifting members, a spinner attached to the lower end of the said shaft, a gearing arranged in the upper end of the frame for operating the spinner shaft for rotation in one direction, means for connecting this gearing to a source of power, a fence comprising a vertical row of interspaced horizontal rods arranged along the one side of the spinner, an outwardly curved end formed on each fence rod, means for attaching the said rod ends to the frame outside the general vertical plane of the rods, slide plate members attached to the frame for raising the lifted beet over the edge of the spinner, feed members traversing the spinner rearwardly from the center thereof, means attached to the spinner shaft for imparting to the feed members eccentric movement over a part of the spinner surface in relation to the fence, a horizontal belt conveyor of conventional type arranged transversely in the frame at the rear end of the spinner, a belt elevator arranged at the one end of the horizontal conveyor, means for operating the conveyor and elevator belts for movement in one direction, and wheels journaled in the rearmost end of the machine frame.

4. A beet lifting machine, comprising in combination a machine frame, two runners attached to the foremost end of the frame, two interspaced beet lifting members, means for attaching the beet lifting members adjustably in height to the machine frame, a substantially vertical shaft journaled rotatably within the frame behind the beet lifting members, a hub member rigidly attached to the lower end of the said shaft, radially extending rods attached alternately in two rows to the edge of the hub member to form a cleaning spinner, means for operating the shaft for rotation in one direction, a plurality of horizontal fence rods attached by their outwardly curved ends outside the general vertical plane of the fence to the frame at one side of the cleaning spinner, slide plate members attached to the frame for raising the lifted beet over the foremost edge of the spinner, a feed member traversing the spinner rearwardly from the center thereof, means attached to the spinner shaft for imparting to the feed member an excentric motion over a part of the spinner surface between the vertical shaft and the fence, a horizontal belt conveyor attached to the rear of the frame transversely to the machine, a belt elevator connected to the one end of the conveyor, means for operating the conveyor and elevator belts for movement in one direction, and wheels journaled in the rear end of the frame.

5. A beet lifting and harvesting machine comprising a frame; two beet lifting members attached to the front end of said frame on each side thereof; slide plates above and adjacent said beet lifting members adapted to receive the lifted beets, a spinner mounted in said frame behind said lifting members and slide plates; means for rotating said spinner; one edge of said slide plates conforming closely to the adjacent edge of said spinner whereby the lifted beets are conveyed over said spinner edge unto the spinner; vertically spaced fence rods along one side of said spinner, said rods having outwardly curved ends attached to the frame outside the general vertical plane of the fence; and means for removing the beets from said spinner.

6. A beet harvesting machine comprising a frame, a pair of cutters attached to the front part of said frame; two beet lifting members attached to said frame and positioned inwardly of and behind said cutters; a spinner rotatably mounted in said frame behind said lifting members; slide plates above and rearwardly adjacent said beet lifting members adapted to receive the lifted beets, said slide plates being positioned between said lifting members and said spinner and one edge thereof conforming closely to the adjacent edge of said spinner whereby the lifted beets are conveyed unto said spinner; vertically spaced fence rods along one side of said spinner, said rods having outwardly curved ends attached to the frame outside the general vertical plane of the fence; and means for removing the beets from said spinner.

7. In a beet harvesting machine, a frame, a beet lifting member attached to said frame, and a spinner journaled in said frame behind said beet lifting member, said spinner having at one side thereof a fence comprising a plurality of vertically spaced rods having outwardly curved ends attached to said frame outside the general vertical plane of the fence; and an additional fence comprising vertically spaced rods attached above and rearwardly of said beet lifting member, said rods being curved back towards said first-named rods and forming therewith a substantially continuous curve.

8. A beet lifting and harvesting machine comprising a frame; a beet lifting member attached to said frame; a substantially triangular slide plate rearwardly of and above said lifting member; a spinner mounted rotatably in said frame behind said slide plate; a fence on one side of said spinner comprising a plurality of vertically spaced rods having outwardly curved ends attached to said frame outside the general vertical plane of said fence; an additional short fence comprising a plurality of vertically spaced rods attached above and rearwardly of said beet lifting member, said second rods being curved back toward said first rods and forming therewith a substantially continuous curve; said triangular slide plate being attached with one edge to the lowest rod of said additional fence, another edge thereof conforming closely to the adjacent edge of said spinner and being disposed slightly above said spinner edge, and the foremost edge of the slide plate extending from the rear end of the beet lifting member to the spinner edge near the longitudinal axis of the machine.

9. In a beet harvesting machine, in combination with a frame, a beet lifting member attached to said frame, and a spinner journaled in said frame behind said beet lifting member, a feed member traversing the spinner rearwardly from the center thereof, means attached to the spinner for imparting eccentric motion to the foremost end of the feed member between the center of the spinner and a fence surrounding part of said spinner, and guide members attached to the rear end of said feed member and slidable longitudinally in the machine frame.

ANDERS KARL KRISTIAN ANDERSEN.
THOMAS ROSENSTAND.

REFERENCES CITED

The following references are of record in the file of this patent:

UNITED STATES PATENTS

| Number | Name | Date |
|---|---|---|
| 26,102 | Hardenbergh | Nov. 15, 1859 |
| 952,873 | Brown | Mar. 22, 1910 |

FOREIGN PATENTS

| Number | Country | Date |
|---|---|---|
| 381,213 | Germany | May 31, 1922 |
| 122,998 | Austria | May 26, 1931 |
| 492,079 | Great Britain | Sept. 14, 1938 |
| 666,280 | Germany | Sept. 22, 1938 |